United States Patent
Reynolds et al.

(10) Patent No.: US 7,240,970 B2
(45) Date of Patent: Jul. 10, 2007

(54) TRAIL LOCOMOTIVE BRAKE CONTROL

(75) Inventors: John M. Reynolds, Copenhagen, NY (US); D. Mark Petitt, LaFargeville, NY (US); Richard J. Teifke, Mexico, NY (US); Scott E. Margeson, Watertown, NY (US); Kevin B. Root, Black River, NY (US)

(73) Assignee: New York Air Brake Corporation, Watertown, NY (US)

( * ) Notice: Subject to any disclaimer, the term of this patent is extended or adjusted under 35 U.S.C. 154(b) by 105 days.

(21) Appl. No.: 11/225,109

(22) Filed: Sep. 14, 2005

(65) Prior Publication Data

US 2007/0057569 A1    Mar. 15, 2007

(51) Int. Cl.
    *B60T 13/00*    (2006.01)
(52) U.S. Cl. .............................. 303/7; 303/128; 303/27
(58) Field of Classification Search .................. 303/3, 303/7, 9, 127, 128, 27, 42
    See application file for complete search history.

(56) References Cited

U.S. PATENT DOCUMENTS

| | | | |
|---|---|---|---|
| 2,958,561 A | 11/1960 | May | |
| 3,623,777 A | 11/1971 | Sarbach et al. | |
| 3,782,782 A | 1/1974 | Brown | |
| 4,491,372 A | 1/1985 | Walley | |
| 4,830,437 A | 5/1989 | Rumsey | |
| 4,971,399 A | 11/1990 | Balukin et al. | |
| 5,020,862 A | 6/1991 | Balukin et al. | |
| 5,172,316 A | 12/1992 | Root et al. | |
| 5,192,118 A | 3/1993 | Balukin et al. | |
| 5,222,788 A | 6/1993 | Dimsa et al. | |
| 5,332,297 A | 7/1994 | Cunkelman et al. | |
| 6,036,284 A | 3/2000 | Pettit et al. | |
| 6,042,201 A * | 3/2000 | Marra et al. | 303/128 |
| 6,238,010 B1 | 5/2001 | Barber et al. | |
| 6,318,811 B1 | 11/2001 | Root et al. | |
| 6,371,575 B1 | 4/2002 | Lewis et al. | |
| 6,401,015 B1 * | 6/2002 | Stewart et al. | 701/19 |
| 6,746,087 B1 | 6/2004 | Reynolds et al. | |

* cited by examiner

*Primary Examiner*—Xuan Lan Nguyen
(74) *Attorney, Agent, or Firm*—Barnes & Thornburg LLP

(57) ABSTRACT

A brake controller for a locomotive includes a train brake pipe, a locomotive brake pipe, a brake cylinder, a control valve and a relay valve. The first control input of the relay valve is selectively connected to one of the output of the control valve and the locomotive brake pipe; and the second control input of the relay valve is selectively connected to the locomotive brake pipe when the control valve output is a release signal. A first electro-pneumatic valve, when activated, causes the control valve to be a release signal. An electronic controller is connected to a first pressure transducer for the locomotive brake pipe, a lead/trail mode switch and the first electro-pneumatic valve; and activates the electro-pneumatic valve for brake release pressures in the locomotive brake pipe when the mode switch is in the trail mode.

5 Claims, 2 Drawing Sheets

TRAIL LOCOMOTIVE BRAKE CONTROL

BACKGROUND AND SUMMARY OF THE INVENTION

The present system relates generally to brake control systems and more specifically to a brake controller for a trail locomotive in a two pipe brake system.

The air braking industry has a long established control scheme of transferring braking requirement from a Lead locomotive to a Trail locomotive through a single train brake pipe or multiple unit brake pipe known as the brake cylinder equalizing or locomotive brake pipe. This is referred to as a two pipe system. This is distinguished by a three pipe brake system which has a train brake pipe, a locomotive apply and release brake pipe and a locomotive activate brake pipe. The Trailing locomotive is manually set to respond to a two pipe system through devices located within its braking system. The Trail locomotive as set does not respond to its control valve for the application of braking effort. Instead, the Trail locomotive responds directly to pressure within the brake cylinder equalizing pipe, which is controlled by the Lead locomotive, for the application of braking effort. The Lead locomotive is manually set to control the two pipe system through devices located within its braking system. The Lead locomotive then controls pressure within the brake cylinder equalizing pipe, which is a summary or cumulative affect of automatic, independent and bail braking controls and commands at the Lead locomotive.

A requirement in the train braking industry is to boost the independent braking request by 160% of the commanded pressure within the brake cylinder equalizing pipe. However, the commanded pressure within the brake cylinder equalizing pipe is not to be boosted for the automatic braking command pressure. An example of a prior art brake system is illustrated in FIG. 1, which will be discussed in detail below. A limitation in the system of FIG. 1 is that it will not resume the 160% of independent brake application after a "bail" or independent brake release if the automatic braking signals a brake apply on the train brake pipe. The automatic brake must signal a brake release in the train brake pipe for the system to resume the 160% of independent brake application.

The present disclosure is a brake control for the Trail locomotive equipped with an electro-pneumatic braking control system that differentiates the independent (locomotive) braking from automatic (train) braking to determine whether to boost pressure by 160% or retain 100%.

A brake controller for a trail locomotive includes a train brake pipe, a locomotive brake pipe, a brake cylinder, a control valve being responsive to pressure in the train brake pipe to produce brake apply and brake release signals at an output, and a relay valve having first and second control inputs and having a source input and an exhaust input selectively connected to an output in response to the control inputs. The first control input is selectively connected to one of the output of the control valve and the locomotive brake pipe; and the second control input is selectively connected to the locomotive brake pipe when the control valve output is a release signal. A first pressure transducer is connected to the locomotive brake pipe. A mode switch having lead and trail modes is provided. A first electro-pneumatic valve is connected to the control valve which, when activated, causes the control valve to be a release signal. An electronic controller is connected to the first pressure transducer, the mode switch and the first electro-pneumatic valve, and activates the first electro-pneumatic valve for brake release pressures in the locomotive brake pipe when the mode switch is in the trail mode.

The control valve output remains as a release signal until a pressure is present in the train brake pipe which requires an increase brake apply signal by the control valve. A second electro-pneumatic valve may be provide which selectively connects the output of the control valve to the first control input of the relay valve. In such case, a second pressure transducer is connected to the train brake pipe. The electronic controller is connected to and controls the second electro-pneumatic valve to a) connect the output of the control valve to the first control input of the relay valve in the trail mode of the mode switch when pressure in the train brake pipe is below an emergency pressure and b) disconnect the control valve from the first control input of the relay valve in the trail mode of the mode switch when pressure in the train brake pipe is above an emergency pressure.

The first and second pneumatic valves may be dynamic brake interlock valves of an electro-pneumatic brake controller. Also a double check valve may be provided and has inputs connected to the output of the control valve and the locomotive pipe and an output connected to the first input of the relay valve.

These and other aspects of the present invention will become apparent from the following detailed description of the invention, when considered in conjunction with accompanying drawings.

DETAILED DESCRIPTION OF THE PREFERRED EMBODIMENTS

Figure 1:
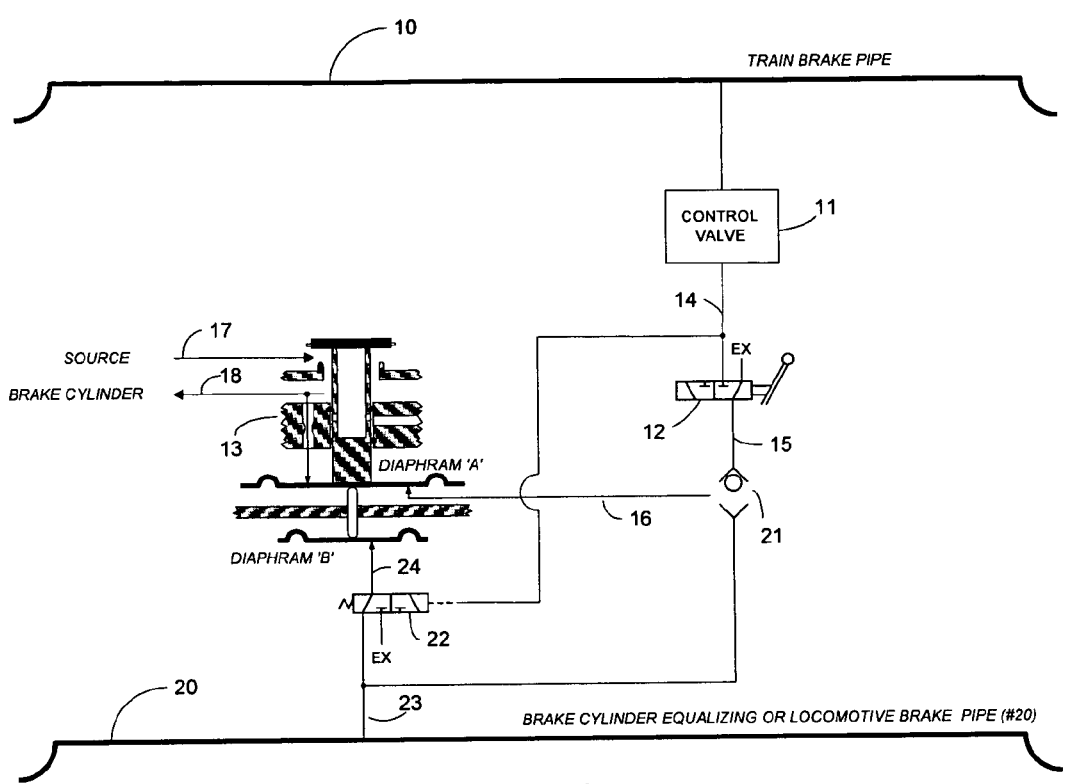
FIG. 1 is a schematic of a portion of a brake controller for a two pipe system of the prior art.

FIG. 1 shows a typical prior art system as arranged for Trail braking. Only the elements that are pertinent to Trail braking are shown. The control valve 11 determines a determines a level of automatic braking by the pressure within the brake pipe trainline 10. Pressure within the brake pipe trainline 10 is controlled by the Lead locomotive. Line 14 is the pressure output level of automatic braking determined by the Trail locomotive control valve 11 from the said brake pipe trainline 10. When the input line 14 to the Lead/Trail selector 12 is disconnected from output line 15, the output line 16 is connected to atmosphere or exhaust as shown. The selector 12, when manually set to the Trail position, prevents the automatic braking level output of the control valve 11 from being connected to the brake cylinder relay 13 and thus preventing development of any braking pressure for the locomotive.

All braking pressure for the Trail locomotive is developed from the pressure level delivered from the Lead locomotive within the brake cylinder equalizing pipe trainline 20. For independent braking, the Lead locomotive determines the operator request and sets the desired pressure level within the brake cylinder equalizing pipe trainline 20. This pressure level via line 23 is delivered as inputs to each the double check valve 21 and the pilot valve 22. When pressure within line 23 being greater than atmosphere as found in line 15, then line 23 is connected through the double check valve 21 to line 16 as input to diaphragm 'A' of the brake cylinder relay valve 13. Also, the input pressure level line 23 is connected through the deactivated pilot valve 22 to line 24 as input to diaphragm 'B' of the brake cylinder relay valve 13. Diaphragm 'A' of the brake cylinder relay valve 13 is the 100% factor and diaphragm 'B' is the 60% factor. The brake cylinder relay valve 13 responds to a combined 160% factor developed output of brake cylinder pressure for the locomotive from the source, main reservoir, supply pressure.

For automatic braking, the Lead locomotive determines the operator request and sets the desired pressure level within the brake pipe trainline 10 and the desired pressure level within the brake cylinder equalizing pipe trainline 20. As described in the first paragraph, the Trail locomotive control valve 11 responds to brake pipe trainline 10 to develop pressure within output line 14. Output line 14 connection to the input line 16 of the brake cylinder relay valve 13 is prevented by the selector 12. Output line 14 is connected to the pilot port of the pilot valve 22 thus activating the pilot valve 22. When activated, the pilot valve 22 disconnects the input line 23 and connects line 24 to atmosphere or exhaust (EX). In this manner, during automatic brake applications, diaphragm 'B' or the 60% factor is removed from the pressure development of brake cylinder pressure. The brake cylinder relay valve 13 responds to the 100% factor developed output of brake cylinder pressure for the locomotive.

The automatic brake may be released by the Lead locomotive on operator command through the mechanics known in the industry as 'bail.' Release due to bail of the automatic brake does not change the pressure level within the brake pipe trainline 10 and thus the pressure developed by the control valve 11 of the Trail locomotive remains in line 14. Pressure in line 14 maintains the pilot valve 22 to the activated position, thus maintaining a 100% factor output of the brake cylinder relay valve 13. A subsequent independent brake application is not applied at the desired 160% factor.

Figure 2:
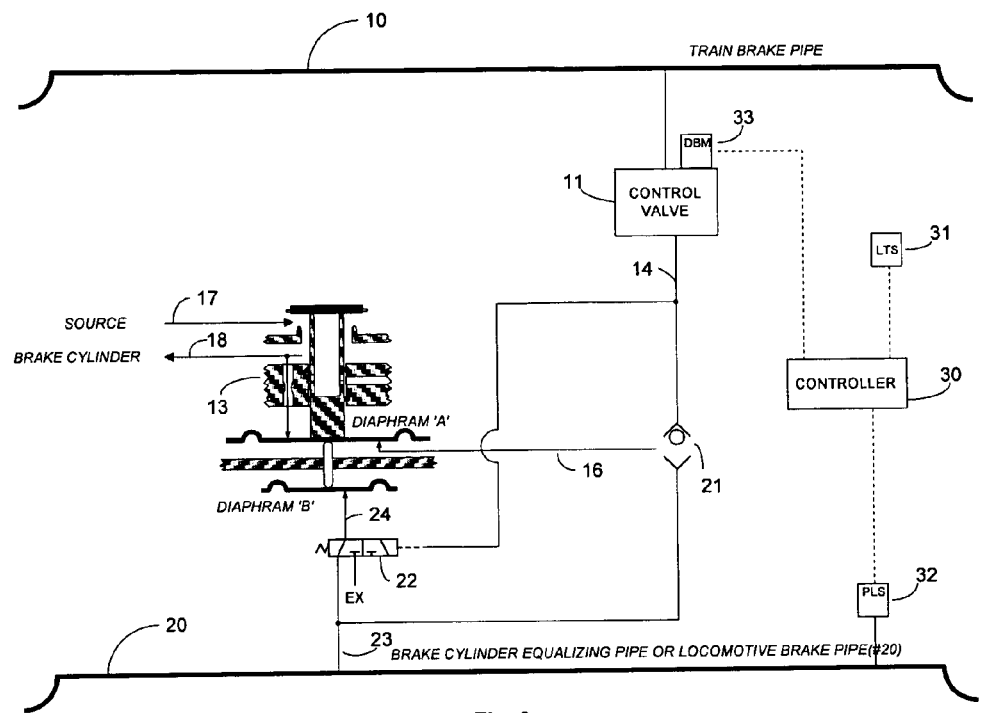
FIG. 2 is a schematic of a portion of a brake controller for a two pipe system illustrating a first embodiment of the present system.

FIG. 2 shows the improvement of the present disclosure as arranged for Trail braking. Only the elements that are pertinent within an electro-pneumatic controlled braking system to Trail braking are shown. Fundamental operation to the prior art are retained, however the pneumatic-mechanical Lead/Trail selector (FIG. 1; 12) is omitted. The control valve 11 determines the level of automatic braking by the pressure in the brake pipe trainline 10 as controlled by the Lead locomotive. The output level of automatic braking in line 14 is connected to the input line 16 of brake cylinder relay 13, through the double check valve 21, when in the Trail position of operation. 100% factor automatic braking level output of the control valve 11 is developed at the output of the brake cylinder relay valve 13 for delivery to the locomotive brake cylinder.

For independent braking, pressure level within the brake cylinder equalizing pipe trainline 20 is delivered as inputs to each the double check valve 21 and the pilot valve 22. When the pressure in line 23 is greater than that in line 14, then line 23 is connected through the double check valve 21 to line 16 as input to diaphragm 'A' of the brake cylinder relay valve 13. Also, the input pressure level line 23 is connected through the deactivated pilot valve 22 to line 24 as input to diaphragm 'B' of the brake cylinder relay valve 13. The brake cylinder relay valve 13 responds to a combined 160% factor developed output of brake cylinder pressure for the locomotive from the source, main reservoir, supply pressure.

For automatic braking, the Lead locomotive determines the operator request and sets the desired pressure level within the brake pipe trainline 10 and the desired pressure level within the brake cylinder equalizing pipe trainline 20. As described, the Trail locomotive control valve 11 responds to brake pipe trainline 10 to develop pressure within output line 14 of the control valve 11. When the pressure in line 14 is greater than that in line 23, then line 14 is connected through the double check valve 21 to input line 16 of the brake cylinder relay valve 13. Conversely, pressure developed within the brake cylinder equalizing pipe trainline 20 by the Lead locomotive as the result of automatic braking is delivered to line 23 of the double check valve 21. The higher of the pressure of line 23 or line 14 is delivered to the input line 16 of the brake cylinder relay valve 13. Secondary, as in the prior art, output line 14 is connected to the pilot port of the pilot valve 22 thus activating the pilot valve 22. When activated, the pilot valve 22 disconnects the input line 23 and connects line 24 to atmosphere or exhaust (EX). In this manner, during automatic brake applications, diaphragm 'B' or the 60% factor is removed from the pressure development of brake cylinder pressure. The brake cylinder relay valve 13 responds to the 100% factor developed output of brake cylinder pressure for the locomotive.

The automatic brake may be released by the Lead locomotive on operator command of 'bail.' Release due to bail of automatic brake does not change the pressure level within the brake pipe trainline 10 and thus the pressure developed by the control valve 11 within line 14. The pressure developed in the brake cylinder equalizing pipe trainline 20 due to automatic brake is fully released to atmosphere. A controller 30, as a portion of the electro-pneumatic braking control system, determines if in the Trail status by the Lead/Trail Switch (LTS) 31 as manually set by an operator. In Trail operation, the controller 30 monitors the pressure level within the brake cylinder equalizing pipe trainline 20 with the pressure level sensor (PLS) 32. When fully released, the controller 30 activates an electro-pneumatic dynamic brake magnet valve (DBM) 33 located on the control valve 11 initially to set the control valve 11 to its 'release' mode, then deactivates or resets the DBM 33. In the 'release' mode the control valve 11 fully exhausts its output line 14 producing a release signal, thus releasing the automatic brake from the locomotive in response to brake cylinder equalizing pipe trainline bail.

As the controller 30 has effected the release of pressure within output line 14 of the control valve 11, pilot valve 22 will deactivate and restore the connection to the 60% factor to the brake cylinder equalizing pipe trainline 20. A subsequent independent brake application will apply at the desired 160% factor.

Subsequent automatic braking command will reinitiate the activity as described.

Figure 3:
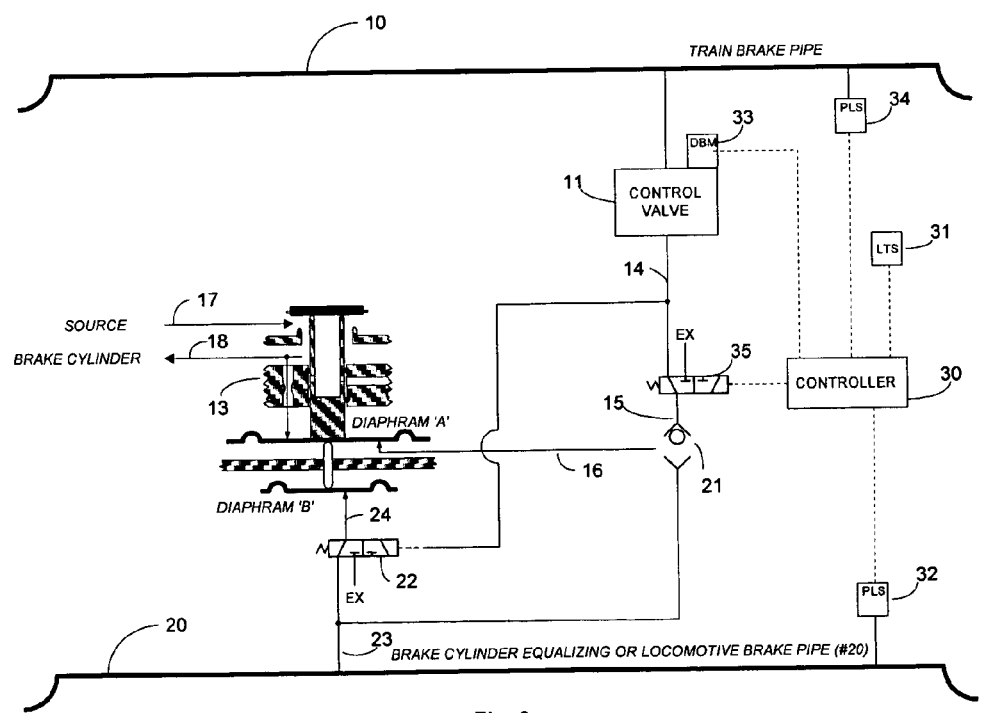
FIG. 3 is a schematic of a portion of a brake controller for a two pipe system illustrating a second embodiment of the present system.

FIG. 3 shows an embellishment to FIG. 2. All the elements of FIG. 2 are retained, however, an electro-pneumatic Lead/Trail selector 35 as activated by the controller 30 is added similar to that of the prior art (FIG. 1; 12). The controller 30, as a portion of the electro-pneumatic braking control system, determines if in the Trail status by the Lead/Trail Switch (LTS) 31 as manually set by an operator. In Trail operation, the controller 30 monitors the pressure level within the train brake pipe trainline 10 with the pressure level sensor (PLS) 34. When determined that the train brake pressure is greater than an automatic emergency level, the controller 30 will activate the electro-pneumatic Lead/Trail selector 35. As in the prior art, the selector 35 when activated prevents the automatic braking level output of the control valve 11 from being connected to the brake cylinder relay 13 and thus preventing development of any braking pressure for the locomotive.

When the train brake pipe trainline 10 pressure is determined less than an automatic emergency level, the controller 30 will deactivate the electro-pneumatic Lead/Trail selector 35 connecting the automatic braking level output of the control valve 11 to the brake cylinder relay 13, thus development of emergency braking pressure for the locomotive.

This function may simply be integrated with resetting dynamic type magnet valve interlock with the controller of the electro-pneumatic braking system.

An example of an electro-pneumatic locomotive brake system is CCB® Locomotive Brake Control Unit available from New York Air Brake Corporation and is illustrated in U.S. Pat. No. 6,036,284, which is incorporated herein by reference. Other electro-pneumatic locomotive brake systems may be used.

Although the present invention has been described and illustrated in detail, it is to be clearly understood that this is done by way of illustration and example only and is not to be taken by way of limitation. The scope of the present invention is to be limited only by the terms of the appended claims.

What is claimed:

1. A brake controller for a locomotive including a train brake pipe, a locomotive brake pipe, a brake cylinder, a control valve being responsive to pressure in the train brake pipe to produce brake apply and brake release signals at an output, and a relay valve having first and second control inputs and having a source input and an exhaust input selectively connected to an output in response to the control inputs; the first control input being selectively connected to one of the output of the control valve and the locomotive brake pipe; and the second control input being selectively connected to the locomotive brake pipe when the control valve output is a release signal; and the brake controller further comprising:

a first pressure transducer connected to the locomotive brake pipe;

a mode switch having lead and trail modes;

a first electro-pneumatic valve connected to the control valve which, when activated, causes the control valve to produce a release signal; and an electronic controller connected to the first pressure transducer, the mode switch and the first electro-pneumatic valve, and activating the first electro-pneumatic valve for brake release pressures in the locomotive brake pipe when the mode switch is in the trail mode.

2. The brake controller according to claim 1, wherein the control valve output remains as a release signal until a pressure is present in the train brake pipe which requires an increase brake apply signal by the control valve.

3. The brake controller according to claim 1, including a second electro-pneumatic valve selectively connecting the output of the control valve to the first control input of the relay valve;

including a second pressure transducer connected to the train brake pipe and the electronic controller; and wherein the electronic controller is connected to and controls the second electro-pneumatic valve to a) connect the output of the control valve to the first control input of the relay valve in the trail mode of the mode switch when pressure in the train brake pipe is below an emergency pressure and b) disconnecting the control valve from the first control input of the relay valve in the trail mode of the mode switch when pressure in the train brake pipe is above an emergency pressure.

4. The brake controller according to claim 3, wherein the first and second pneumatic valves are dynamic brake interlock valves of an electro-pneumatic brake controller.

5. The brake controller according to claim 1, including a double check valve having inputs connected to the output of the control valve and the locomotive pipe and output connected to the first input of the relay valve.

* * * * *